United States Patent [19]

Ferenczy

[11] Patent Number: 5,245,580
[45] Date of Patent: Sep. 14, 1993

[54] ELECTROMECHANICAL TIMEPIECE

[75] Inventor: Laszlo Ferenczy, Basel, Switzerland

[73] Assignee: Eta SA Fabriques d'Ebauches, Granges, Switzerland

[21] Appl. No.: 747,609

[22] Filed: Aug. 20, 1991

[30] Foreign Application Priority Data

Aug. 21, 1990 [CH] Switzerland ............ 02711/90

[51] Int. Cl.$^5$ ............................................. G04B 1/00
[52] U.S. Cl. ...................................... 368/204; 368/203
[58] Field of Search ............................. 368/203, 204

[56] References Cited

U.S. PATENT DOCUMENTS

| 4,362,396 | 12/1982 | Perrot | 368/203 |
| 4,435,088 | 3/1984 | Dorfman | 368/88 |
| 4,623,206 | 11/1986 | Fuller | 339/17 |
| 4,956,827 | 9/1990 | Spadini | 368/69 |
| 5,062,090 | 10/1991 | Komiyama | 368/88 |
| 5,072,330 | 12/1991 | Fuqua | 368/316 |

FOREIGN PATENT DOCUMENTS 2539604 9/1974 Fed. Rep. of Germany .

OTHER PUBLICATIONS

Patent Abstracts of Japan, vol. 1, No. 142, Nov. 18, 1977; pp. 7117 E 77; & JP-A-52 80 170 (Suwa Seikosha K.K.) Jul. 5, 1977.

Schmuck & Uhren, No. 23/24, Dec. 1980, pp. 41–49, Ulm/Donau, DE.

Primary Examiner—Bernard Roskoski
Attorney, Agent, or Firm—Griffin, Butler, Whisenhunt & Kurtossy

[57] ABSTRACT

The present invention relates to a timepiece of the electromechanical type.

This invention has a movement provided with control means such as an electronic circuit connected with a resonator, a source of electrical energy, and in particular battery, and electrical connection means to connect this battery to the control means via the intermediary of a first supply path wherein the electrical connection means also supply a second parallel supply path which is capable of providing a substantially permanent and reliable connection between at least one of the poles of the battery and the control means.

This invention has applications in any electromechanical timepiece such as, for example, a wristwatch.

8 Claims, 2 Drawing Sheets

ELECTROMECHANICAL TIMEPIECE

FIELD OF THE INVENTION

The present invention relates to an electromechanical timepiece and, more specifically, to a timepiece having an energy source such as a battery conventionally termed a button battery.

DESCRIPTION OF THE PRIOR ART

Conventional electromechanical timepieces of this type have a horometric movement basically driven by an electronic control circuit having a resonator such as a quartz resonator. The battery supplies the electronic circuit which maintains the vibrations of the resonator and provides motor impulses to a motor which is, for example, of the stepping type. This motor is kinematically connected to time indication means which are conventionally in the form of hands. Electrical connection means constituting a supply path ar provided to connect the battery to the electronic control circuit.

This supply path is generally composed of two electrical connection strips that are connected frontally (negative) and laterally (positive) respectively, the former being arranged so that it is in mechanical contact with one of the substantially planar areas of the battery whereas the second bears against the cylindrical edge of the battery.

More specifically, in horometric movements having a plate made of an injection moulded plastic material, the lateral support strip is provided on a spring pin formed by an embossed metal wafer, this wafer having additional strips, the one mechanically maintaining the time base whilst the other supplies power to the electronic control circuit.

To ensure that the contact between the cylindrical edge of the battery and the lateral strip remains as reliable and as constant as possible over a period of time a resilient stirrup is provided in a region diametrically opposite this strip which is firmly mounted on the plate and which exerts a pressure on the cylindrical edge of the battery which retains this battery against the lateral strip forming the positive electrical connection.

It has, however, been found during homologation tests at specific frequencies, and notably during vibration resistance tests, that the resilient retaining stirrup does not perform its function in a lasting and permanent manner since the edge of the battery tends to become detached from the lateral electrical connection strip, thereby naturally resulting in interruption of the supply and hence a loss in the time.

SUMMARY OF THE INVENTION

It is consequently an object of the present invention to overcome these inconveniences by providing a timepiece in which electrical connection means between the battery and the various operational means of the movement ensure, without risk of failure, permanent electrical contact between the battery and these operational means to avoid any interruption in supply and discrepancy between the actual time and the time shown.

The object of the invention is thus an electromechanical timepiece having:
a movement provided with control means such as an electronic circuit which is associated with a resonator and drives a motor kinematically linked to time display means such as hands,
energy supply means, such as a battery, capable of supplying power to said control means,
electrical connection means which connect the poles of said battery to said control means by way of a first supply path, whereby said electrical connection means comprise a second supply path in parallel forming an additional electrical path adapted to ensure a substantially permanent and reliable connection between at least one of the poles of the battery, especially to the lateral edge thereof and said control means.

It will thus be understood that, in this case, by providing a second supply path in addition to the first, there is a corresponding reduction in the risk of loss of contact due to the vibrations which can affect a timepiece.

According to a further feature of the invention, the second supply path at least partly involves the motor stator.

It should also be stated that this second supply path is moreover composed of a contact element which is electrically connected to said control means and in particular the electronic circuit and which bears against the stator. This contact element advantageously consists of a support strip integral with a spring pin.

BRIEF DESCRIPTION OF THE DRAWINGS

The invention will be better understood from the following detailed description given merely by way of example and with reference to the accompanying drawings in which.

DETAILED DESCRIPTION OF THE INVENTION

Figure 1:
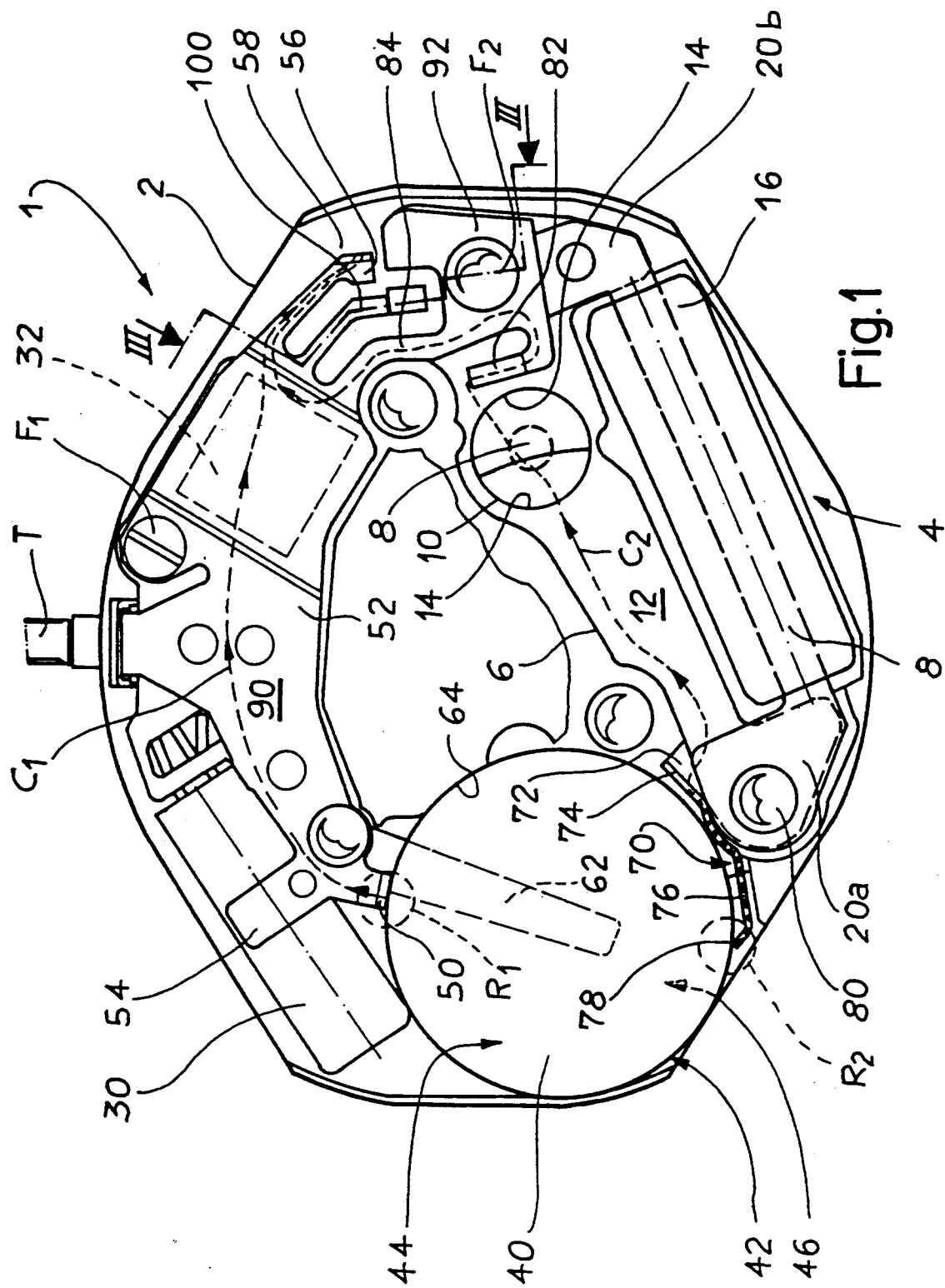
FIG. 1 is a plan view of a movement designed to equip a timepiece of the invention.

The accompanying drawings show a timepiece according to the invention which has a movement 1 composed substantially of a plate 2, advantageously of synthetic material such as injection moulded plastic material. This movement 1 is also provided with a motor 4, for example of the stepping type, which has a stator 6 with a rotor 8, such as a compound-filled permanent magnet (not shown) pivotally mounted in relation thereto, freely rotatably mounted on two axes inside a cage 10 mounted in the stator 6.

Figure 2:
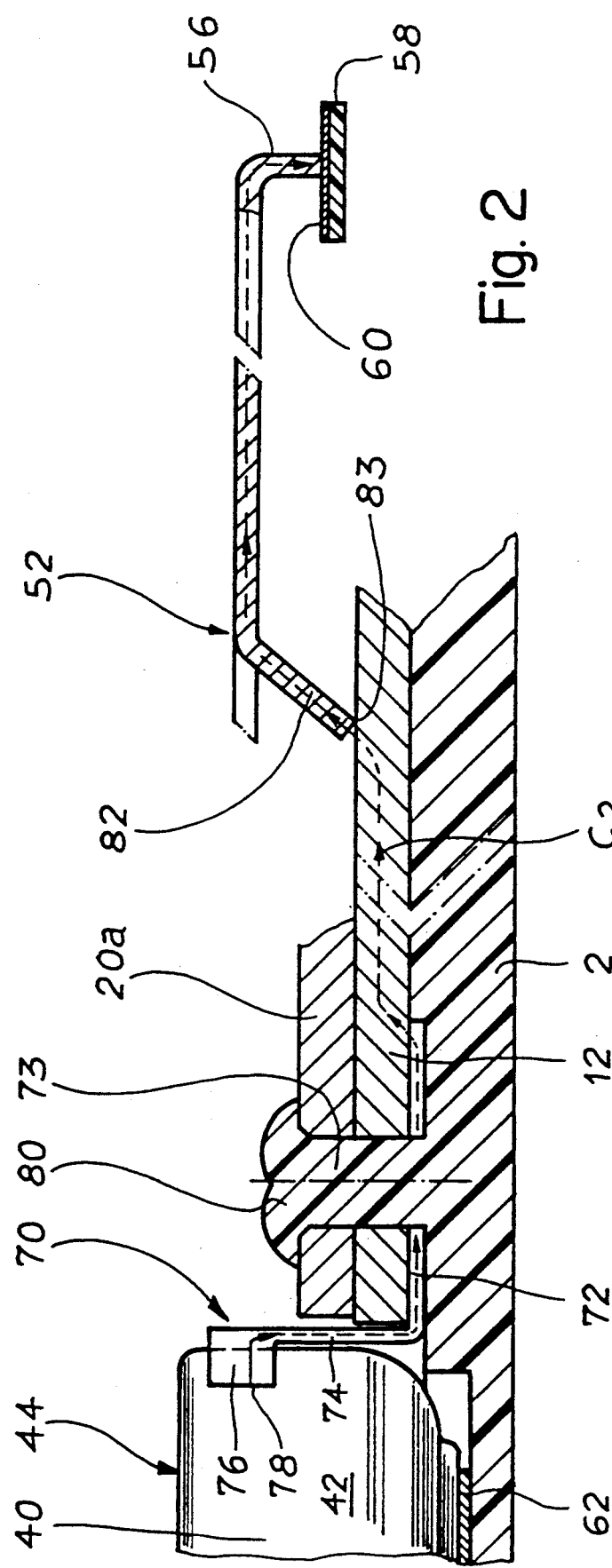
FIG. 2 is a very diagrammatic section of part of the movement of FIG. 1 which shows, more specifically, arranged in the same plane, the elements composing the second supply path of the invention.
Figure 3:
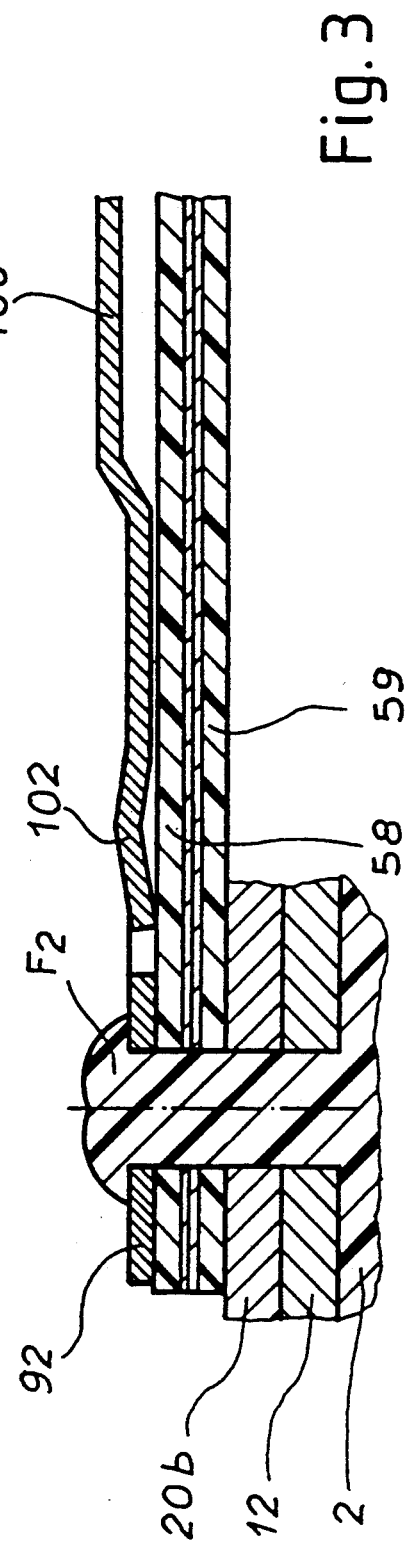
FIG. 3 is a sectional view along the line III—III of FIG. 1 and shows another retaining strip capable of maintaining electrical contact between two printed circuits of the motor and the electronic circuit of the timepiece of the invention respectively.

The stator 6 is composed of a stator-like part 12 which induces a polar field 14 enabling the flux created by a trip coil 16 to be guided towards the rotor 8. The coil 16 is substantially formed by winding several parallel and superimposed turns of a conducting wire about a core 8, the ends 20a and 20b of which are in close planar contact on the stator-like part 12 as is shown in the case of the end 20a in FIG. 2 and the end 20b in FIG. 3. It should be stated here that the stator-like part 12 is preferably made of a material such as "Vacoperm" or "Permanorm" (Registered Trademarks). The movement 1 of the invention also has a resonator 30 substantially composed of a frequency stabilized quartz crystal, this resonator 30 being connected to an electronic circuit 32 which, as a function of the stabilized frequency of the resonator 30, is capable of supplying substantially inverted motor impulses to the motor 4 and more specifically the coil 16, so that this trip coil 16 is able to create a magnetic flux in the stator-like part 12. This flux causes the rotor 8 to rotate by a predetermined fraction of a revolution. Since this operation is that of a conventional electromechanical timepiece it will not be explained in greater detail here.

It suffices to state that a rotor pinion 8 meshes with one wheel of a gear train (not shown) ending in means for showing the time, such as hands, to effect a kinematic connection between the motor 4 and these indicating means. In this case it is therefore possible to obtain analog information on the time using electromechanical means.

However, this electromechanical assembly cannot operate without an energy source constituted, in this particular case, by a battery 40 of the button battery type. This supply battery 40 therefore makes it possible to supply enough electrical power to the electronic circuit 32 which maintains the vibration of the resonator 30 and which, via the intermediary of a group of transistors, is able to drive and excite the coil 16 of the motor 4. The resonator 30, the electronic circuit 32 and the motor 4 constitute the operational control system of the movement 1.

This type of battery, such as the button battery 40, is widely marketed and is extremely common in electromechanical timepieces, such as this object of the present invention.

This battery 40 is substantially cylindrical in shape and has an edge or circumference 42 shaped like part of a cylinder and is furthermore delimited on both sides by two substantially planar regions of larger surfaces, 44 and 46 respectively. One of the regions, region 46 in this example, and the cylindrical edge 42 constitutes the two poles, positive (+) and negative(−) of the battery 40.

In this specific example, the cylindrical peripheral edge 42 has been defined as constituting the positive pole of the battery whereas the front surface 46 situated opposite the movement 1, facing the plate 2, constitutes the negative pole. This choice is, of course, arbitrary.

In order that the battery 40 can supply its electrical energy to the various operational elements of the movement 1, namely to the control means 4, 30 and 32, the timepiece of the invention has electrical connection means forming a first supply path, only one part of which C1, which is the positive part, is shown. The negative part is conventional and its construction and details, not shown, are known to the person skilled in the art.

The electrical connection means which form this first supply path C1 are primarily composed of a lateral support strip 50 which is integral with a spring pin 52 made of an electrically conducting material. More specifically, the spring pin 52 is made of a embossed wafer which makes it possible to hold a pin T in position. The lateral support strip 50 is preferably of the same material as the pin 52. The spring pin 52 has a second strip 54 which retains the resonator 30 and holds it in position. It has a third strip 56 which extends in a direction substantially perpendicular to the plate 2 towards part of a printed circuit 58 of the electronic control circuit 32 to bear against a metal part 60 provided on the surface of this printed circuit to supply the electronic circuit 32 with electrical power.

In addition, the front support strip 62 which constitutes the electrical connection with the negative terminal of the battery 40 is arranged at the bottom of a cavity 64 provided in the plate 2. This strip is also electrically connected to the electronic control circuit 32 by part of the electrical connection means which are not shown here.

In an area R2 which is diametrically opposite the region R1 of the movement 2 in which is arranged the lateral support strip 50 there is provided a resilient stirrup 70 constituting a lateral support arranged in pressure contact on the cylindrical edge 42 of the battery 40. This resilient lateral support stirrup 70 is composed of an embossed wafer which is provided on the one hand with a base 72 (FIG. 2) mounted on a stud 73 which is advantageously of the same material as the plastic wafer 2 and, on the other hand, with a first arm 74 extending substantially vertically in a manner perpendicular to the plate 2 towards the outside thereof, parallel to the cylindrical edge 42 of the battery 40. The first arm 74 of the resilient lateral support stirrup 70 is extended by a second terminal arm 76, the free extremity 78 of which forms the actual electrical contact with the cylindrical edge 42. This second arm 76 is able to absorb, by means of flexible resilient deformation, any excessive movement of the battery 40 in its seating 64. It will be noted in this context that the free extremity 78 of the second arm 76 extends towards the outside of the movement 2 so as to face its lateral circumference in such a manner that the free extremity 78 is arranged in a position as nearly as possible diametrically opposed in relation to the lateral support strip 50 of the first electrical supply path C1.

The base 72 of the resilient stirrup 70 thus bears against the plastic wafer 2 of the movement 1, whereas there are stacked thereon in superimposed manner on the one hand the stator-like part 12 and, on the other hand, the end 20a of the core 8. The base 72 is thus retained sandwiched in a secure manner by this wafer 2 and by the stator-like part 12. This assembly of base 72-stator-like part 12-end 20a is firmly mounted on the plate 2 by means of a head 80 of the stud 73 and, more specifically, by its free extremity. The head 80 is formed by ultrasonic fusion. It will be noted that the planar contact between the upper surface of the base 72 and the lower surface of the stator-like part 12 ensure excellent electrical contact between the positive pole of the battery 40 and the stator-like part 12.

In addition, the spring pin 52 has an additional strip 82 preferably made of the same material which forms a contact element bearing against the upper surface of the stator 6 and, more specifically, on the upper surface of its stator-like part 12. This additional strip 82 is connected to the terminal strip 56 by a connection strip 84 likewise integrally provided in the spring pin 52. It will thus be understood that the resilient lateral support stirrup 70, the stator-like part 12, the contact element 82 as well as the connection strip 84 constitute at least in part a second supply path C2 which is in parallel with the first and which is able to ensure a substantially permanent and reliable connection via the stator 6 between the positive pole of the battery and the control means of the movement, such as the electronic circuit 32. This second supply path C2 has a part in common with the first supply path C1, this common part being the negative part, not shown, of the electrical connection means of the invention. It will be noted that the free extremity of the additional strip 82 of the second electrical supply path C2 presents a sharp angle forming a cutting edge 83 capable, as will be seen, of substantially penetrating the stator-like part 12.

The spring pin 52, and more specifically the additional contact strip 82 is made of a material such as "Durimphy" (Registered Trademark) and the materials which form this additional support strip 82 and the stator-like part 12 itself are chosen in such a way that the surface hardness of the material of the stator-like part 12 is less than the hardness of the contact strip 82. By way of example, the stator-like part 12 has a Vickers pyramid hardness of the order of 200, whereas the strip 82 has a hardness usual for steel of the order of 540 Vickers. This surface penetration of the additional strip 82 into the upper surface of the stator-like part 12 ensures good electrical contact between these elements.

It will also be noted that the spring pin 52 has two characteristic regions, the first composed of a main section 90 which forms the spring pin per se and from which extend the electrical connection strip 50, the retaining strip 54, the connection strip 84 and the terminal strip 56 which is connected to the printed circuit 58 of the electronic circuit 32. This first main section 90 is one of the essential features of the first electrical supply path C1.

This spring pin 52 also has a second main section 92 which is an integral part of the second electrical supply path C2 and from which extends the additional contact strip 82 in the direction of the stator-like path 12. The two main sections 90 and 92 are connected to each other by the connection strip 84 which forms electrical connection means between these two sections. It will thus be understood that all these elements, being of the same material, may be manufactured very economically and can also be very quickly mounted on the plate whilst still being simultaneously transportable and manipulateable by simplified operations. It will also be noted that the two main sections 90 and 92 respectively are fixed on the plastic plate 2 by the intermediary of their own fixing means F1 and F2 respectively, the fixing means F1 of the first main section 90 being composed of a screw and of the head of a stud similar to the stud 73, whereas the fixing means F2 of the second section 92 is composed of a stud also similar to the stud 73.

It will also be noted that from the first main section 90 there extends another retaining strip 100, directed towards the second region 92 the free extremity 102 of which is substantially directed in the direction of the plate 2 to bear only mechanically on the printed circuit 58 of the electronic control circuit 32 which is arranged to bear on the printed circuit 59 of the motor 4 and which is connected to the coil 16. Consequently, this retaining strip 100 which is substantially retained by the first main section 90 of the spring pin 52 may by itself secure the two printed circuits 58 and 59 respectively if the stress generated by the contact element 82 were to break the head of the stud F2.

I claim:

1. An electromechanical timepiece comprising:

a movement provided with control means formed by an electronic circuit which is associated with a resonator and drives a motor kinematically linked to time display means such as hands, said motor comprising a rotor and a stator, an energy source, such as a battery, capable of supplying power to said control means, and, electrical connection means connecting poles of said battery to said control means by way of a first and a second supply path, each said path consisting of negative and positive portions, said second supply path being connected in parallel to said first supply path said second supply path being made up of at least in part of said stator.

2. A timepiece according to claim 1 wherein said second supply path is in addition composed of a contact strip which is electrically connected to said electronic circuit and which bears against said stator.

3. A timepiece according to claim 2 wherein said contact strip is integral with a spring pin and is formed as an embossed wafer so that it bears resiliently against said stator.

4. A timepiece according to claim 3 wherein said contact strip is of the same material as said spring pin and is cut therein.

5. A timepiece according to claim 4 wherein said wafer forming the spring pin is cut in two main sections of larger surface, a first which forms the spring per se and which forms the first supply path and a second section which is an integral part of the second supply path, these two sections being connected together by electrical connection means.

6. A timepiece according to claim 5 wherein the connection means are of the same material as the two main sections.

7. A timepiece according to claim 6 wherein the two sections are individually mounted on the plate by separate fixing means.

8. A timepiece according to claim 7 wherein at least one additional retaining strip extends from the first section in the direction of the second and bears resiliently against a printed circuit of the electronic control circuit, this printed circuit bearing directly on a printed circuit connected to the motor.

* * * * *